(12) United States Patent
Sato et al.

(10) Patent No.: US 9,945,732 B2
(45) Date of Patent: Apr. 17, 2018

(54) TEMPERATURE SENSOR

(71) Applicant: DENSO CORPORATION, Kariya, Aichi-pref. (JP)

(72) Inventors: Motoki Sato, Kariya (JP); Tsunenobu Hori, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 14/810,596

(22) Filed: Jul. 28, 2015

(65) Prior Publication Data

US 2016/0025574 A1  Jan. 28, 2016

(30) Foreign Application Priority Data

Jul. 28, 2014 (JP) ................................. 2014-152724

(51) Int. Cl.
*G01K 7/00* (2006.01)
*G01K 1/08* (2006.01)
*G01K 7/16* (2006.01)

(52) U.S. Cl.
CPC ........ *G01K 1/08* (2013.01); *G01K 7/16* (2013.01)

(58) Field of Classification Search
CPC .................................. G01K 1/08; G01K 7/16
USPC ............... 374/208, 153, 179; 338/22, 28, 25
See application file for complete search history.

(56) References Cited

U.S. PATENT DOCUMENTS

| 4,447,309 A | * | 5/1984 | Morioka | ................ G01N 27/38 204/402 |
|---|---|---|---|---|
| 2013/0077653 A1 | | 3/2013 | Koshimizu et al. | |
| 2016/0025576 A1 | | 1/2016 | Sato et al. | |
| 2016/0033337 A1 | | 2/2016 | Sato et al. | |

FOREIGN PATENT DOCUMENTS

| JP | 2005-294653 | | 10/2005 |
|---|---|---|---|
| JP | 2005294653 A | * | 10/2005 |
| JP | 2011-232066 | | 11/2011 |
| JP | 2011232066 A | * | 11/2011 |
| JP | 2013-072769 | | 4/2013 |

* cited by examiner

*Primary Examiner* — Lisa Caputo
*Assistant Examiner* — Janice M Soto
(74) *Attorney, Agent, or Firm* — Nixon & Vanderhye P.C.

(57) ABSTRACT

A temperature sensor has a thermosensitive element that detects temperature, a pair of element electrode wires electrically connected to the thermosensitive element, and a glass sealing body that has a sealing portion covering the thermosensitive element and a part of the element electrode wires. Further, the temperature sensor has a tablet that has an interface and a pair of insertion holes into which the element electrode wires are inserted, the tablet being joined to the glass sealing body through the interface. Further, the temperature sensor has a low Young's modulus layer provided in the glass sealing body, made of a material having lower low Young's modulus than that of a material forming the sealing portion, and at least partially connecting the sealing portion and the interface of the tablet.

7 Claims, 6 Drawing Sheets

BASE END SIDE ←—X—→ TIP END SIDE

TEMPERATURE SENSOR

CROSS-REFERENCE TO RELATED APPLICATION

This application is based on and claims the benefit of priority from earlier Japanese Patent Application No. 2014-152724 filed on Jul. 28, 2014, the description of which is incorporated herein by reference.

BACKGROUND

Technical Field

This disclosure relates to a temperature sensor having a ceramic part.

Related Art

A temperature sensor shown in PTL1 is used in various device such as vehicles (PTL1: Japanese Patent Application Publication No. 2013-72769). The temperature sensor of PTL1 has a thermistor element for detecting temperature, a tablet made of a ceramic material, and a glass sealing body made of a glass material. The glass sealing body covers the thermistor element and is jointed to the end face of the tablet.

SUMMARY

However, the temperature sensor of PTL1 has the following problem.

In the temperature sensor of PTL1, the ceramic tablet and the glass sealing body, which are two parts having different linear expansion coefficients, are joined to each other. Accordingly, in the temperature sensor, when temperature changes, thermal stress might be generated between the tablet and the glass sealing body.

For solving the problems, this disclosure has an object to provide a temperature sensor which can suppress occurrence of thermal stress.

A temperature sensor has a thermosensitive element that detects temperature, a pair of element electrode wires electrically connected to the thermosensitive element, and a glass sealing body that has a sealing portion covering the thermosensitive element and a part of the element electrode wires. Further, the temperature sensor has a tablet that has an interface and a pair of insertion holes into which the element electrode wires are inserted, the tablet being joined to the glass sealing body through the interface. Further, the temperature sensor has a low Young's modulus layer provided in the glass sealing body, made of a material having lower low Young's modulus than that of a material forming the sealing portion, and at least partially connecting the sealing portion and the interface of the tablet.

DETAILED DESCRIPTION OF PREFERRED EMBODIMENTS

In the temperature sensor, the low Young's modulus layer is formed on the whole interface of the tablet. Thus, thermal stress occurring in the temperature sensor can be reduced by increasing formation area of the low Young's modulus layer.

It is preferred that the Young's modulus of the material of the low Young's modulus layer is 50 GPa or more. This can ensure strength and the effect of reducing thermal stress. It is preferred that the Young's modulus of the material of the low Young's modulus layer is 100 GPa or less. This can suppress lowering of elasticity of the low Young's modulus layer.

It is preferred that the low Young's modulus layer is made of lead glass containing lead. In this case, the low Young's modulus layer can be formed readily in the glass sealing body.

It is preferred that the sealing portion is made of borosilicate glass where boron oxide is added in the glass. This can improve thermal shock-resistance, thereby preventing damage of the glass sealing body.

It is preferred that the sealing portion is made of lead-free glass containing no lead. This can increase strength of the glass sealing body readily.

First Embodiment

Figure 1:
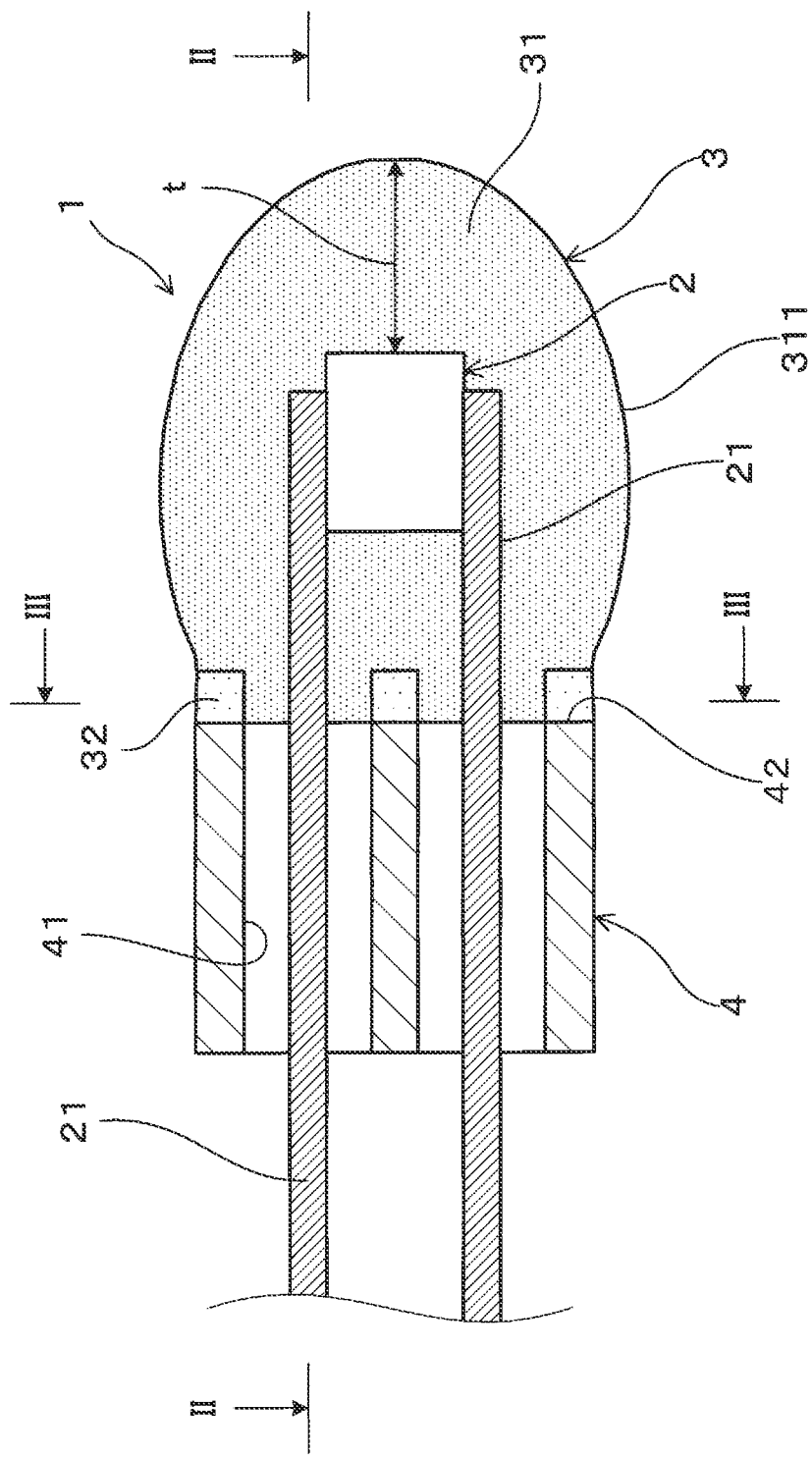
FIG. 1 is a cross-sectional view showing a temperature sensor of a first embodiment.
Figure 2:
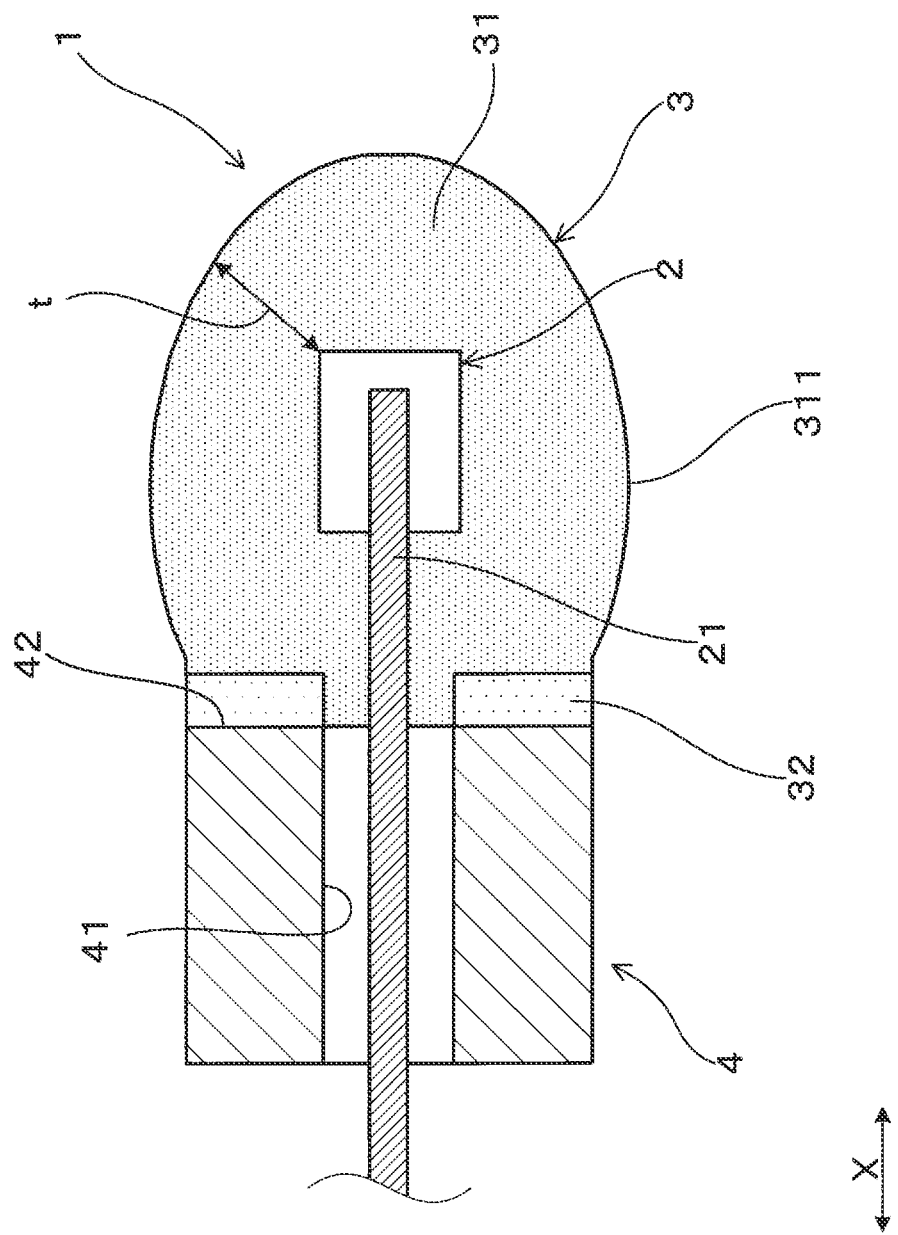
FIG. 2 is a cross-sectional view showing the temperature sensor of the first embodiment, viewed along arrows II-II in FIG. 1.
Figure 3:
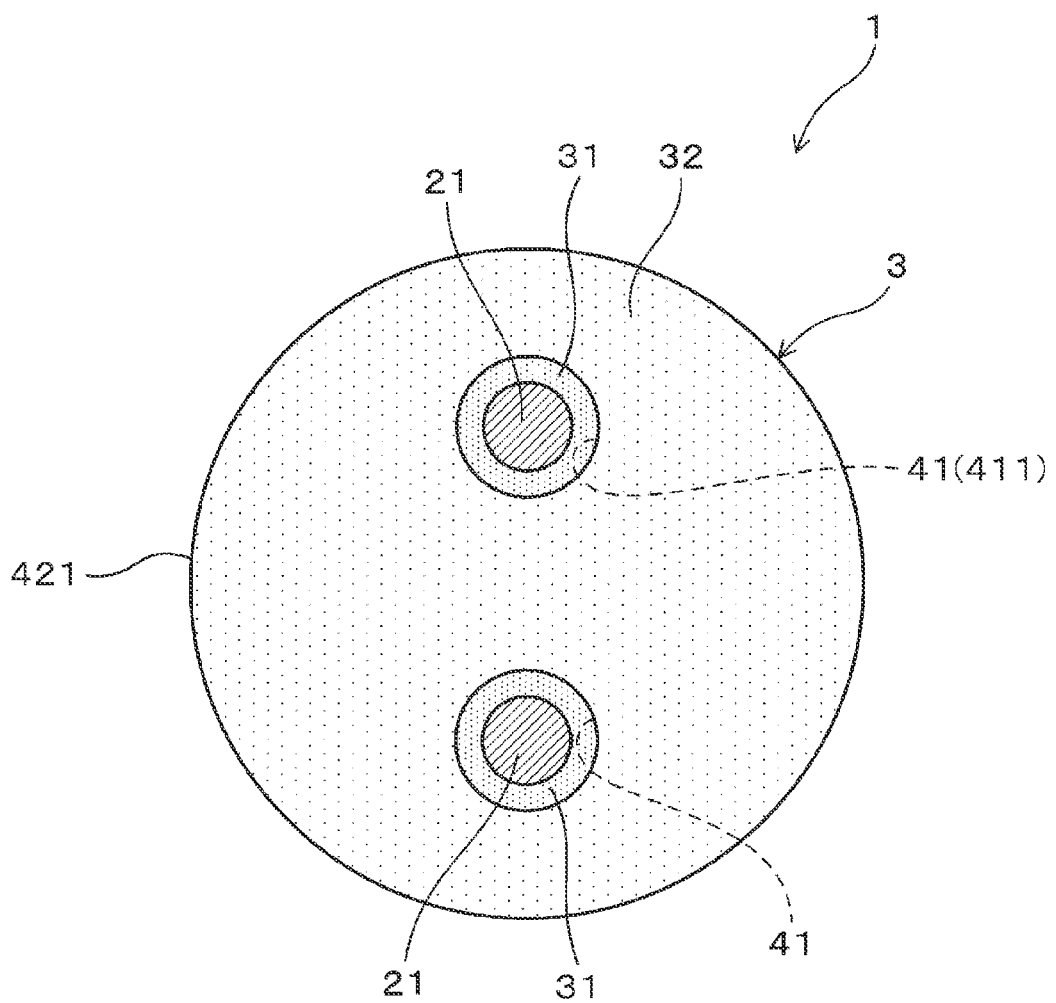
FIG. 3 is a cross-sectional view showing the temperature sensor of the first embodiment, viewed along arrows III-III in FIG. 1.

With reference to FIGS. 1 to 3, now is described a first embodiment of a temperature sensor.

As shown in FIGS. 1 to 3, the temperature sensor 1 has a thermosensitive element 2 for detecting temperature and a pair of element electrode wires 21 electrically connected to the thermosensitive element 2. Further, the temperature sensor 1 has a glass sealing body 3 covering the thermosensitive element 2 and a part of the element electrode wires 21, and a tablet 4 forming a pair of insertion holes 41 into which the pair of electrodes 21 are inserted. The tablet 4 has an interface 42 joined to the glass sealing body 3. The glass sealing body 3 has a sealing portion 31 and a low Young's modulus layer 32. The sealing portion 31 covers the thermosensitive element 2. The low Young's modulus layer 32 is made of a material having lower Young's modulus than that of the material forming the sealing portion 31, and is joined to the whole interface 42 of the tablet 4.

Hereinafter the sensor is further described in detail.

As shown FIGS. 1 and 2, in this embodiment, in the axial directions X of the element electrode wires 21, a side where the thermosensitive element 2 is arranged is referred to as a tip end side (tip end direction), and a side to which the element electrode wires 21 extends from the thermosensitive element 2 is referred to as a base end side (base end direction).

It will be noted that the low Young's modulus layer 32 and the insertion holes 41 are enlarged in the drawings for convenience.

In this embodiment, the temperature sensor 1 is used in a hydrogen tank of a fuel-cell vehicle. When the hydrogen tank is filled with hydrogen, the temperature sensor 1 detects the temperature in the hydrogen tank to control filling speed, thereby shortening the time needed for filling.

The thermosensitive element 2 is a resistive temperature element, and is fixed in a state where the thermosensitive element 2 is sandwiched by the element electrode wires 21 arranged parallel to each other.

The element electrode wires 21 are made of platinum alloy, and formed into a circular columnar shape extending along the axial direction. The platinum alloy contains Pt (platinum) as the base metal and Ir (iridium). The Ir content A is, for example, 20 wt %. Accordingly, the Ir content A satisfies the relation of 0 wt %<A≤20 wt %. The linear expansion coefficient $\alpha_r$ of the element electrode wires 21 is $8.4 \times 10^{-6}/°$ C., and the Young's modulus E4 thereof is 201 GPa. Although the element electrode wires 21 are made of platinum alloy in this embodiment, it may be made of pure platinum.

The tablet 4 is made of a ceramic material containing forsterite as a base material, is formed into a substantially columnar shape, and forms the pair of insertion holes 41 extending along the axial direction X and penetrating the tablet 4. The diameters of the insertion holes 41 are larger than the diameter of the element electrode wires 21, and the insertion holes 41 are formed such that the element electrode wires 21 can be disposed inside the insertion holes 41. The Young's modulus E3 of the tablet 4 is 150 GPa. Although forsterite is most preferable as the material of the tablet 4, other ceramic materials such as alumina, mullite, zirconia, yttria, cermet, sapphire, steatite or the like may be used.

As shown in FIGS. 1 and 2, the glass sealing body 3 has the sealing portion 31 covering the thermosensitive element 2, and the low Young's modulus layer 32 connecting the sealing portion 31 and the tablet 4.

The sealing portion 31 is lead-free, and made of lead-free borosilicate glass with boron oxide contained therein. The sealing portion 31 is designed to have linear expansion coefficient $\alpha_g$ of $8.5 \times 10^{-6}/°$ C., and Young's modulus E1 of 81 GPa. The sealing portion 31 is formed such as to cover the thermosensitive element 2 and the tip portion of the element electrode wires 21. The thickness t of sealing portion between an outer periphery surface 311 of the sealing portion 31 and the thermosensitive element 2 satisfies the relation of 0.4 mm≤t≤3 mm.

The low Young's modulus layer 32 is made of lead glass containing lead, and is formed into a substantially circular plate on the whole interface 42 of the tablet 4, the interface 42 being joined to the glass sealing body 3. The thickness of the axial direction of the low Young's modulus layer 32 is set at 0.2 mm. In this embodiment, the low Young's modulus layer 32 is removed at portions overlapping the insertion holes 41, and is formed from the inner periphery edge 411 of the insertion holes 41 to the outer periphery edge 421 of the tablet 4. The Young's modulus E2 of the low Young's modulus layer 32 is set at 52 GPa. Accordingly, the Young's modulus E1 of the sealing portion 31 and the Young's modulus E2 of the low Young's modulus layer 32 satisfies the relation of E1>E2.

Next, function and effect of this embodiment are described.

In the temperature sensor 1 of this embodiment, providing the low Young's modulus layer 32 in the glass sealing body 3 can suppress thermal stress between the glass sealing body 3 and the tablet 4. That is, the low Young's modulus layer 32 is made of the material having lower Young's modulus than that of the material configuring the sealing portion 31, i.e. the low Young's modulus layer 32 is made of the material having higher elasticity (that is, elastic material). Accordingly, if a difference of linear expansion between the glass sealing body 3 and the tablet 4 is generated, the low Young's modulus layer 32 is deformed, thereby reducing thermal stress between both.

In the temperature sensor 1, the low Young's modulus layer 32 is formed on the whole interface 42 between the sealing portion 31 of the sealing portion 3 and the tablet 4. Accordingly, the low Young's modulus layer 32 efficiently moderates the difference of linear expansion generated between the sealing portion 31 and the tablet 4, and thereby the thermal stress generated in the temperature sensor 1 can further be reduced.

The Young's modulus of the material forming the low Young's modulus layer 32 is 50 GPa or more. This can ensure strength and the effect of reducing thermal stress.

The low Young's modulus layer 32 is made of lead glass containing lead. Accordingly, the low Young's modulus layer 32 can be formed readily in the glass sealing body 3.

The glass sealing body 3 is made of borosilicate glass with boron oxide contained therein. This can improve thermal shock-resistance, thereby preventing damage of the glass sealing body 3.

The glass sealing body 3 is made of lead-free glass containing no lead. This can increase strength of the glass sealing body 3 readily.

The element electrode wires 21 are made of platinum alloy containing iridium, and the iridium content A is 0 wt %<A≤20 wt %. This can bring the linear expansion coefficient of the element electrode wires 21 close to the linear expansion coefficient of the sealing body 3, thereby preventing damage of the sealing body 3 due to difference of linear expansion. Further, strength of the element electrode wires 21 can be improved readily.

As described above, according to the temperature sensor 1 of this embodiment, strength against thermal shock can be increased.

Second Embodiment

Figure 4:
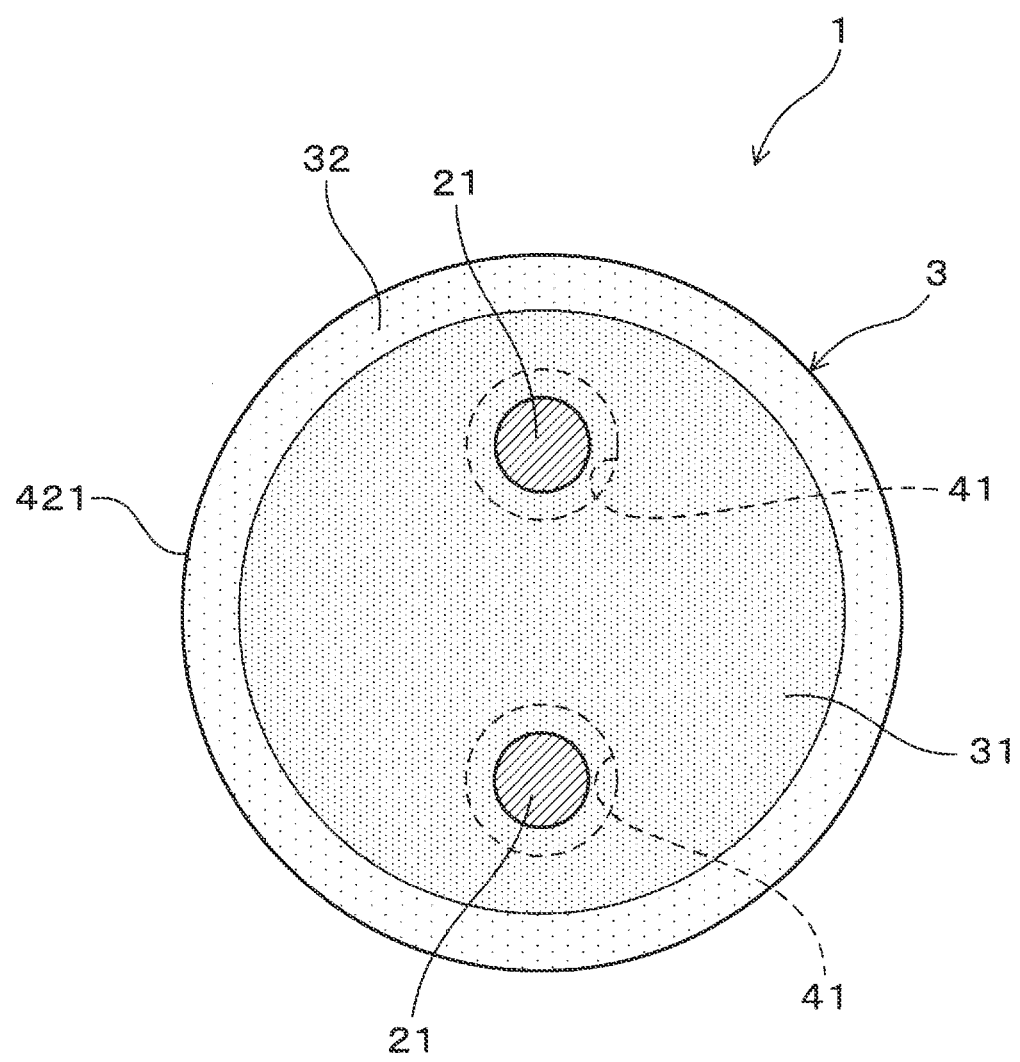
FIG. 4 is a cross-sectional view showing an example of a temperature sensor of a second embodiment (corresponding to FIG. 3)
Figure 5:
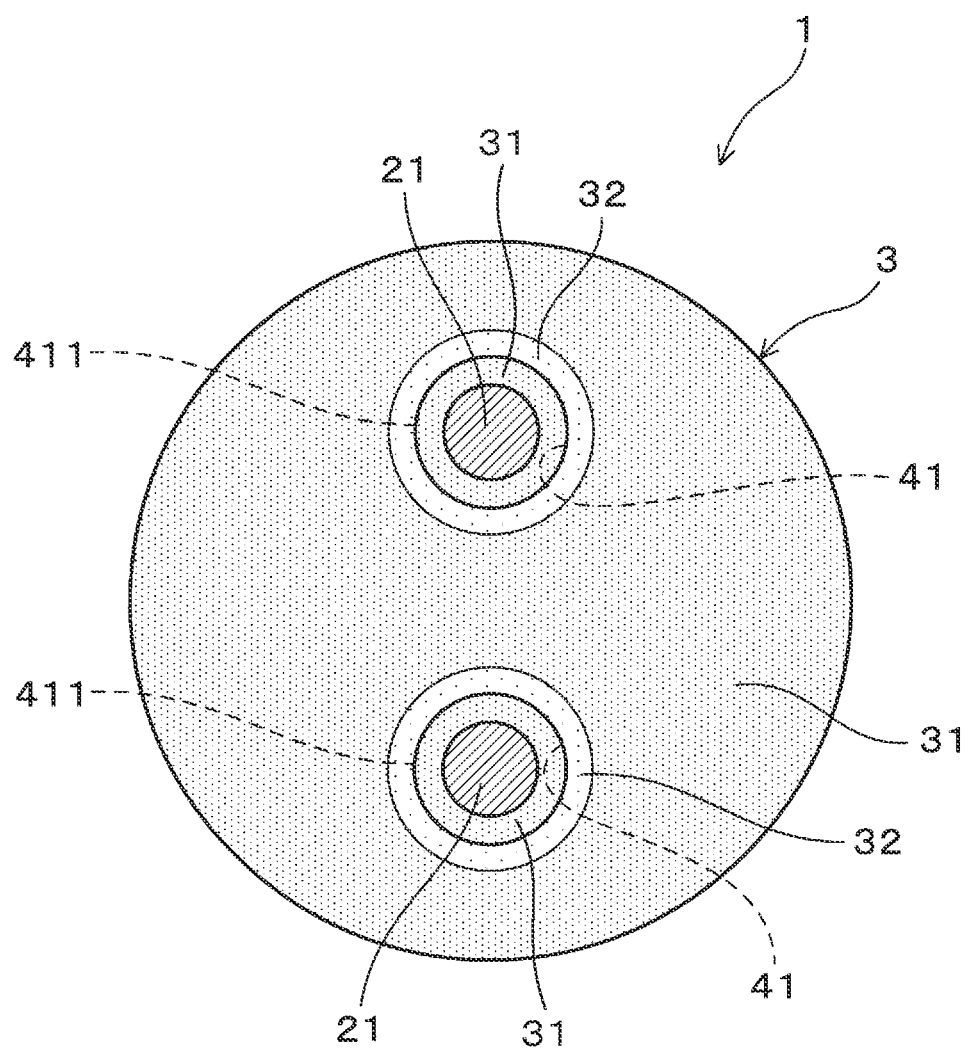
FIG. 5 is a cross-sectional view showing another example of a temperature sensor of the second embodiment (corresponding to FIG. 3)

In this embodiment, as shown in FIGS. 4 and 5, the structure of the temperature sensor of the first embodiment is partially modified.

In the temperature sensor 1 shown in FIG. 4, the low Young's modulus layer 32 is formed into a circular ring shape along the outer periphery edge 421 of the tablet 4.

In the temperature sensor 1 shown in FIG. 5, the low Young's modulus layer 32 is formed into two rings which surround the inner periphery edges 411 of the insertion holes 41, respectively.

The other configurations are the same as the first embodiment. It will be noted that, of the reference numerals used in this embodiment and the drawings of this embodiment, the same reference numerals as the first embodiment show the same elements as the first embodiment, unless otherwise defined.

In this embodiment, between the glass sealing body 3 and the tablet 4, the low Young's modulus layer 32 is formed especially at the outer periphery edge 421 of the tablet 4 or at the inner periphery edge 411 of the insertion hole 41, which are likely to generate thermal stress. Thus, thermal stress can be reduced efficiently, the formation area of the low Young's modulus layer 32 being reduced. It will be noted that as needed, the low Young's modulus layer 32 may be formed at the outer periphery edge 421 of the tablet 4 or at the inner periphery edge 411 of the insertion hole 41 as shown in FIGS. 4 and 5, or these may be combined.

Third Embodiment

Figure 6:
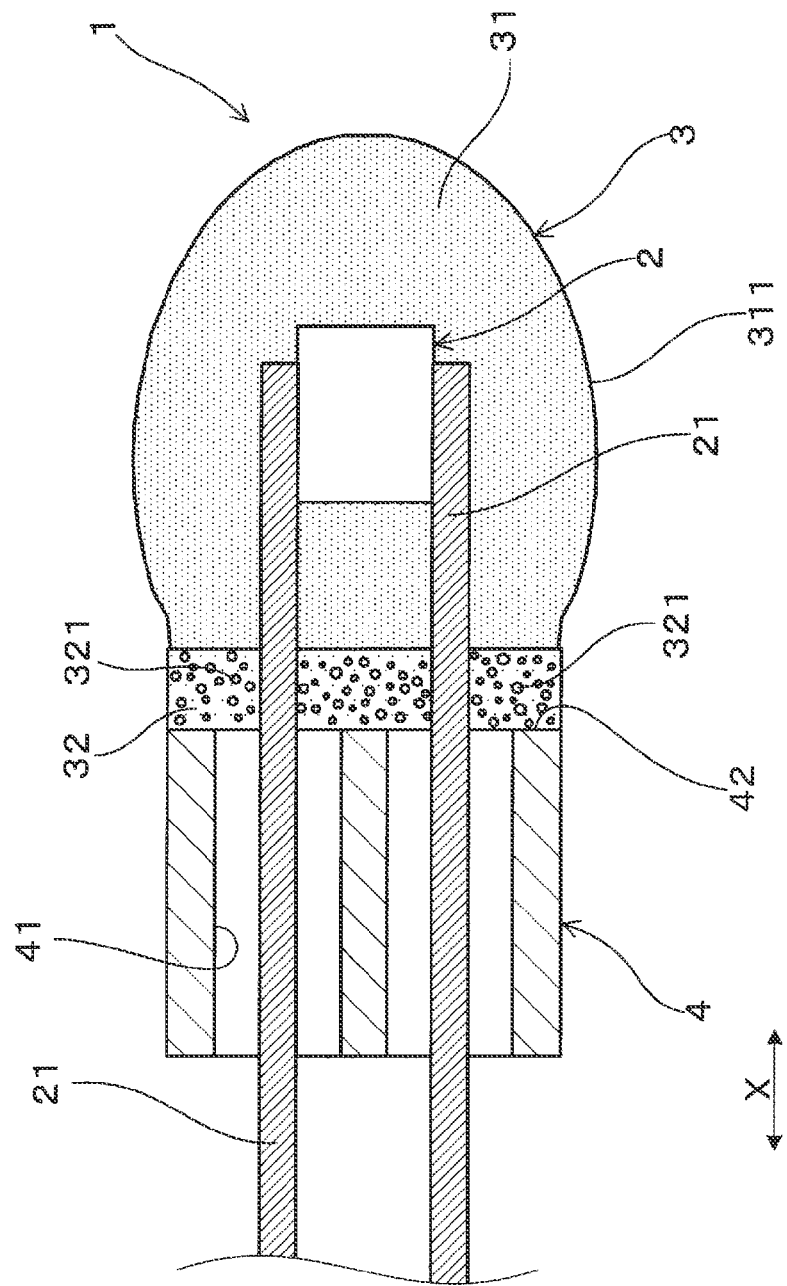
FIG. 6 is a cross-sectional view showing a temperature sensor of a third embodiment.

In this embodiment, as shown in FIG. 6, the structure of the temperature sensor in the first embodiment is partially modified.

In the temperature sensor 1 of this embodiment, the low Young's modulus layer 32 is formed such that the thickness of the axial direction thereof is about 1 mm. A plurality of air voids 321 are formed inside the low Young's modulus layer 32.

The other configurations are the same as the first embodiment. It will be noted that, of the reference numerals used in this embodiment and the drawings of this embodiment, the same reference numerals as the first embodiment show the same elements as the first embodiment, unless otherwise defined.

In the temperature sensor 1 of this embodiment, the Young's modulus in the low Young's modulus layer 32 can further be reduced by forming the air voids 321 inside the low Young's modulus layer 32. This can reduce thermal stress more efficiently by the low Young's modulus layer 32.

In this embodiment, the same effects as the first embodiment can be obtained.

Though the invention has been described with respect to the specific preferred embodiments, many variations and modifications will become apparent to those skilled in the art upon reading the present application. It is therefore the intention that the claims be interpreted as broadly as possible in view of the prior art to include all such variations and modifications.

The invention claimed is:

1. A temperature sensor, comprising:
a thermosensitive element that detects temperature;
a pair of element electrode wires electrically connected to the thermosensitive element;
a glass sealing body that has a sealing portion covering the thermosensitive element and a part of the element electrode wires;
a tablet that has an interface and a pair of insertion holes into which the element electrode wires are inserted, the tablet being made of ceramic material and joined to the glass sealing body through the interface; and
a low Young's modulus layer provided in the glass sealing body, made of a material having lower Young's modulus than that of a material forming the sealing portion, and connecting the sealing portion and the interface of the tablet, the low Young's modulus layer being formed on a part of or a whole of the interface of the tablet.

2. The temperature sensor according to claim 1, wherein the low Young's modulus layer is formed on the whole interface of the tablet.

3. The temperature sensor according to claim 1, wherein the Young's modulus of the material of the low Young's modulus layer is 50 GPa or more.

4. The temperature sensor according to claim 1, wherein the low Young's modulus layer is made of lead glass containing lead.

5. The temperature sensor according to claim 1, wherein the sealing portion is made of borosilicate glass where boron oxide is added into glass.

6. The temperature sensor according to claim 1, wherein the sealing portion is made of lead-free glass.

7. The temperature sensor according to claim 1, wherein the element electrode wire is made of platinum or platinum alloy containing iridium, and the iridium content A in the platinum alloy is 0 wt %<A≤20 wt %.

* * * * *